United States Patent
Herrmann

(10) Patent No.: US 7,958,542 B2
(45) Date of Patent: Jun. 7, 2011

(54) METHODS AND DEVICES FOR COUNTING USER EQUIPMENT UNITS IN A MOBILE RADIO TELECOMMUNICATION NETWORK

(75) Inventor: Christoph Herrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 396 days.

(21) Appl. No.: 10/556,286

(22) PCT Filed: May 11, 2004

(86) PCT No.: PCT/IB2004/050630
§ 371 (c)(1), (2), (4) Date: Jan. 25, 2007

(87) PCT Pub. No.: WO2004/102901
PCT Pub. Date: Nov. 24, 2004

(65) Prior Publication Data
US 2007/0172068 A1    Jul. 26, 2007

(30) Foreign Application Priority Data
May 14, 2003 (EP) .................................... 03101354

(51) Int. Cl.
*H04L 9/32* (2006.01)
*H04L 9/00* (2006.01)
*G06F 7/04* (2006.01)

(52) U.S. Cl. ............ 726/4; 380/278; 380/279; 713/168; 713/169; 713/170; 713/171; 726/3; 726/5; 726/6; 726/7

(58) Field of Classification Search .................. 380/249; 726/4
See application file for complete search history.

(56) References Cited

U.S. PATENT DOCUMENTS

| 5,396,543 A * | 3/1995 | Beeson et al. ................ 455/560 |
| 6,275,695 B1 * | 8/2001 | Obhan ......................... 455/423 |

FOREIGN PATENT DOCUMENTS

| JP | 2002051006 A | 2/2002 |
| JP | 2003069491 A | 3/2003 |
| WO | 0219593 A2 | 3/2002 |
| WO | 2004102901 A1 | 11/2004 |

OTHER PUBLICATIONS

3GPP TS 25.346 V1.20 (Jan. 2001) 3rd Generation Partnership Project; Technical Specification Group Radio Access Network; Introduction of the Multimedia Broadcast Multicast Service (MBMS) in the Radio Access Network: Global System for Mobile Communication pp. 1-16.

(Continued)

*Primary Examiner* — Longbit Chai
(74) *Attorney, Agent, or Firm* — Edward W. Goodman

(57) ABSTRACT

For the transmission of an MBMS content to a plurality of user equipment units, the use of a p2m channel may only be beneficial if the number of joined user equipment units exceeds a threshold. However, counting is made difficult due to the fact that idle mode UE, also a non joined UE, may reply to the notification, and hence pretend a higher number of UEs which are ready and able to receive the MBMS content. According to the present invention, when joining the MBMS service, a number which is only known to the user equipment unit, as well as to those RNCs which will deliver the MBMS service for which the UE has joined, is provided to the UE. Whenever the UE replies to a service notification, it uses this number. The RNC determines a corresponding number and in case the number received from the UE matches the number determined by the RNC, the UE is counted. Advantageously, an integrity protection may be provided for the notification reply for joined UEs which are still in the idle mode.

21 Claims, 3 Drawing Sheets

OTHER PUBLICATIONS

3GPP TR 23.846 6.1.0 (Dec. 2002) 3rd Generation Partnership Project; Technical Specification Group Services and System Aspects; Multimedia Broadcast/Multicast Service (MBMS); Architecture and functional description (Release 6) GSM: Global System for Mobile Communication pp. 1-114.

* cited by examiner

METHODS AND DEVICES FOR COUNTING USER EQUIPMENT UNITS IN A MOBILE RADIO TELECOMMUNICATION NETWORK

The present invention relates to the field of mobile radio telecommunication networks. In particular, the present invention relates to a method of counting user equipment units subscribed to a service, to a radio network controller for counting user equipment units subscribed to a service, to a user equipment unit for operation in a radio cell controlled by a radio network controller, to a software program for operating a radio network controller of a mobile radio telecommunication network and a software program for operating a user equipment unit in a radio cell, controlled by a radio network controller of a mobile radio telecommunication network.

3 GPP TS 25.346v1.3.0: "Introduction of Multimedia Broadcast/Multicast Service (MBMS) in the Radio Access Network (Stage-2)" describes a method for transmitting the same content or data to a plurality of receiver UEs (UE: user equipment) in one or more radio cells of a mobile radio telecommunication system. The question concerned is the efficient transmission of multimedia data to a closed group of subscribers or receivers (multicast) or all receivers in a radio cell (broadcast). Due to the fact that the transmission may concern a closed group of UEs or all UEs or subscribers in a radio cell, such services are referred to as "Multimedia Broadcast/Multicast Services" (MBMS). The MBMS payload data or user data will be referred to as MBMS content in the following. The method described in 3 GPP TS 25.346v1.3.0: "Introduction of Multimedia Broadcast/Multicast Service (MBMS) in the Radio Access Network (Stage-2)" is hereby incorporated by reference.

According to 3 GPP TS 23.846v6.1.0, "Multimedia Broadcast/Multicast Service; Architecture and Functional Description, (Release 6)", a UMTS-subscriber can only receive MBMS content with his UE, if he has subscribed to the MBMS service, and has activated the service. Service activation is also called "joining the service". Service activation at least means that network nodes are informed about the identity of a UE or of a UMTS-subscriber, that wants to receive certain MBMS content. UEs used by a UMTS-subscriber, who has joined an MBMS service, are also called '"joined" UEs', 'UEs, which have joined an MBMS service' or 'UEs with an activated MBMS service'. A UE with an activated MBMS service may or may not receive the MBMS service in a radio cell, where it is actually distributed.

Due to the fact that the same MBMS content is transmitted to a plurality of UEs within the same or a limited number of radio cells, in most cases the use of a p2m (point-to-multipoint) channel is advantageous, since the content/data has to be sent only on one physical channel, to which a plurality of UEs listen simultaneously. Accordingly, the plurality of UEs may (simultaneously) decode the data sent on this one physical channel. However, due to the CDMA (Code Division Multiple Access) technology used in UMTS, the use of a p2m channel is disadvantageous, if only a small number of receiving UEs are concerned.

In other words, in case only a limited number of UEs among those, which have joined the MBMS service, and which intend to receive the MBMS content, the parallel transmission of the data/content on such a small number of p2p (point-to-point) channels may be more efficient, in comparison to the transmission via a p2m channel. Such p2p channels are in UMTS represented by the so-called dedicated channels (DCHs).

DCHs usually have a closed-loop power control, which advantageously may be more efficient and favorable with respect to the resulting interference in comparison to a p2m channel, in case only a small number of UEs are subscribed to the service and receive the same MBMS content. For example, with respect to the resulting interference, a DCH is advantageous in comparison to a p2m channel without closed-loop power control, in case there is only one UE within the radio cell subscribed to the MBMS service. According to R2-022584, "Power Usage for Mixed FACH und DCH for MBMS", Lucent Technologies, which is hereby incorporated by reference, for up to five UEs receiving the same data/content, the use of p2p channels is advantageous in comparison to the use of one p2m channel. However, the exact number or threshold above which the use of a p2m channel is advantageous in comparison to the use of p2p channels depends also on the regional distribution of the UEs within the radio cell. Therefore, 3 GPP TS 25.346v1.3.0: "Introduction of Multimedia Broadcast/Multicast Service (MBMS) in the Radio Access Network (Stage-2)" provides for the possibility of switching the transmission between a plurality of DCHs and one p2m channel depending on the number of UEs within the radio cell, which are subscribed to the service, and receive the same MBMS content/data. The criterion for switching the transmission between a plurality of DCHs and one p2m channel is the number of joined UEs within one radio cell, which receive the same data content, i.e. in case the number of UEs receiving the service in one radio cell exceeds a threshold $S_{p2p}$, the MBMS content is transmitted in this cell via a p2m channel, otherwise via a plurality of DCHs. The decision with respect to the switching is made by the radio network controller (RNC).

If an MBMS service delivery starts, the RNC has, in many cases, no idea whether the number of UEs in a radio cell is high enough to justify the use of a p2m channel. Then, after announcing the start of content delivery via a notification channel, the RNC can obtain information about the number of recipients (UEs) in reply to this notification. For joined UEs, which are already in connected mode, the reply is integrity-protected, i.e. the RNC can assume that the reply originates from a UE which has previously authenticated itself to the UMTS network, and which has actually joined the MBMS service. For "joined" UEs which are still in idle mode, the reply cannot be integrity-protected, since there is not yet any integrity protection available in the UE for the RNC. Hence, after a content delivery notification, any idle mode UE, also a non-joined UE, could reply to the notification and hence pretend a higher number of UEs, which are ready and able to receive the MBMS content. As a consequence, the RNC would decide to use a p2m channel, although a number of p2p channels would be more suitable.

It is an object of the present invention to provide for an accurate counting of user equipment units (UEs) subscribed to a service.

According to an exemplary embodiment of the present invention, the above object may be solved with a method of counting user equipment units subscribed to a service wherein each of the user equipment units subscribed to the service is provided with a key. The user equipment units are located within a radio cell of a mobile radio telecommunication network. An announcement message is broadcast in the radio cell, e.g. that the service starts a content delivery. A first token is transmitted from the user equipment units to the mobile radio telecommunication network, which matches the first token to second tokens in the mobile radio telecommunication network. According to an aspect of the present invention, pairs of corresponding first and second tokens are counted. In other words, according to this exemplary embodiment of the present invention, first tokens from the UEs are matched to second tokens in the mobile radio telecommunication network. In case the first token can be matched to a second token, there is a UE subscribed to the service. Thus, by counting pairs of corresponding first and second tokens, the number of UEs within the radio cells subscribed to this service can be determined. Advantageously, idle mode UEs and active UEs within the radio cells which are subscribed to the service can be counted accurately and it may be avoided that non-joined UEs are included in the counting.

According to another exemplary embodiment of the present invention as set forth in claim 2, the first tokens in the user equipment unit are generated on the basis of identifiers and keys and the second tokens are generated in the mobile radio telecommunication network (for example in the RNC) on the basis of the identifiers and the respective keys stored in the mobile radio telecommunication network. Advantageously, according to this exemplary embodiment of the present invention, an improved integrity protection for the notification reply may be provided for joined UEs which are still in the idle mode.

According to another exemplary embodiment of the present invention as set forth in claim 3, the user equipment units subscribed to the service include an auxiliary number in the generation of the first token. Then, the first token and the auxiliary number are transmitted to the mobile radio telecommunication network. The auxiliary number allows to avoid that a re-sent counting message, i.e. a counting message which has already been sent from one UE, can be re-sent by another UE. According to an aspect of this exemplary embodiment of the present invention, the auxiliary number may be sent as a part of the counting message as plain text. Advantageously, this allows that the auxiliary number does not have to be transmitted via a notification channel.

According to another exemplary embodiment of the present invention as set forth in claim 4, the auxiliary number is a time stamp. According to this exemplary embodiment of the present invention, the mobile radio telecommunication network compares the received time stamp with a threshold time of the counting process. In case the received time stamp is older than the threshold, the mobile radio telecommunication network assumes that the received time stamp is part of a counting message, which was copied and re-sent, and does not include this counting message in the actual counting. In case the time stamp does not exceed the threshold time, the counting message is included in this counting process.

According to another exemplary embodiment of the present invention as set forth in claim 5, the auxiliary number is a randomly determined number, which is transmitted to the user equipment units with the announcement message. In this case, there is no need to include this auxiliary number also in the counting message, since the CRNC, which sends the announcement message, knows this random number, and can use it in the process of computing the second token.

According to another exemplary embodiment of the present invention as set forth in claim 6, the auxiliary number is incremented for each counting process. Thus, for each counting process there is only one valid auxiliary number. In case the mobile radio telecommunication network receives the first token together with the auxiliary number, it only matches the first token to the second token if the first token is received together with the actual, i.e. valid auxiliary number for the respective counting process. This avoids that counting messages copied during a preceding counting process falsify the counting results of an actual counting process.

Claims 7 to 11 provide for further exemplary embodiments of the present invention.

According to another exemplary embodiment of the present invention as set forth in claim 12, a radio network controller such as, for example, an RNC, is provided for counting user equipment units within a radio cell, which are subscribed to a particular service. The user equipment units within the radio cell which are subscribed to the service and have activated the service, are counted by matching first tokens received from the user equipment units to second tokens stored in the radio network controller. According to this exemplary embodiment of the present invention, the number of matched pairs of first and second tokens is output as the number of user equipment units within the radio cell, which are subscribed to the service. Based on this number, a reliable decision can be made by the mobile radio telecommunication system with respect to whether a p2p or p2m channel is more advantageous to transmit the respective content/data to the user equipment units subscribed to the service.

Claims 13 and 14 provide further exemplary embodiments of the present invention.

According to another exemplary embodiment of the present invention as set forth in claim 15, a user equipment unit such as, for example, a mobile phone, a PDA, a notebook or similar devices for operation in a radio cell is controlled by a radio network controller. According to this exemplary embodiment of the present invention, the user equipment unit generates a first token on the basis of an identifier and a key, which was received from the radio network controller during an initialization of the respective user equipment unit to the service (i.e. during a subscribing process of the UE to the service). The first token is transmitted to the radio telecommunication network.

Claim 16 provides an advantageous exemplary embodiment of the user equipment according to the present invention.

According to another exemplary embodiment of the present invention as set forth in claim 17, a software program for operating a radio network controller of a mobile radio telecommunication network for counting user equipment units subscribed to a service is provided.

According to another exemplary embodiment of the present invention as set forth in claim 18, a software program or computer program is provided for operating a user equipment unit in the radio cell controlled by a radio network controller of a mobile radio telecommunication network.

The software programs according to the above exemplary embodiments of the present invention are preferably loaded into a working memory of a data processor of the user equipment units or the mobile radio telecommunication network. The data processor is thus equipped to carry out the methods according to the invention. The software programs may be stored on a computer readable medium, such as a CD-Rom. The software programs may also be presented over a network such as the Worldwide Web and can be downloaded into the working memory of a data processor from such a network.

It may be seen as the gist of an exemplary embodiment of the present invention that, when a UE joins a service, a secret (not service specific) number is provided to the UE, which is only known to the UE, as well as to those RNCs in the mobile radio telecommunication network which deliver the service for which the UE has joined. This secret number or key, according to an aspect of the present invention, may hence be part of an MBMS content stored in each RNC. Whenever the joined UE replies to a service notification, it uses its secret number, together with, for example, an auxiliary number, which may be sent in clear text as part of the notification for determining a token, which the notifying RNC also computes from the secret number and the auxiliary number. Then, by counting tokens generated by the UE and sent to the network and generated by the RNC, an accurate number of UEs subscribed to the service which are located within the radio cells, can be determined. Advantageously, this provides integrity protection for the notification reply, also for joined UEs, which are still in the idle mode.

These and other aspects of the present invention are apparent from and will be elucidated with reference to the embodiments described hereinafter and with reference to the following drawings.

Figure 1:
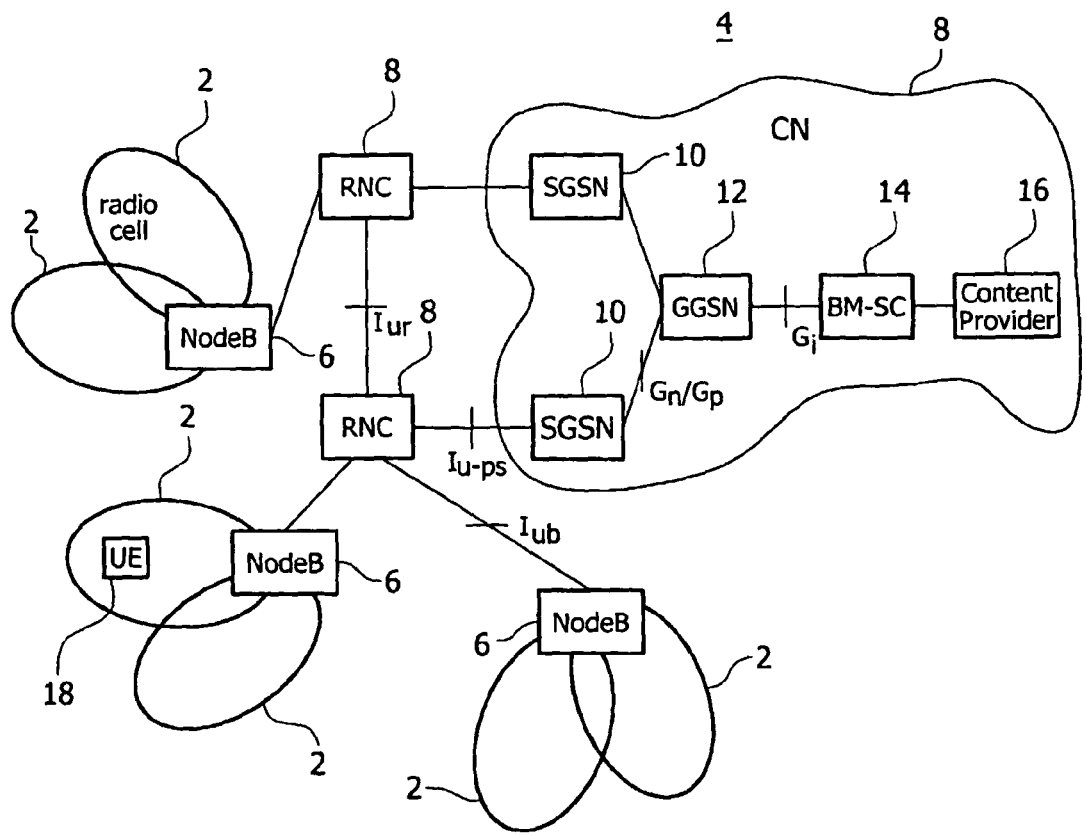
FIG. 1 shows a schematic representation of a simplified network architecture of an exemplary embodiment of a mobile radio telecommunication network according to the present invention, including exemplary embodiments of a radio network controller and user equipment units according to the present invention.

FIG. 1 shows an exemplary embodiment of a network architecture according to an exemplary embodiment of the present invention. In FIG. 1, a plurality of radio cells 2 are part of the mobile radio telecommunication network 4. As shown in FIG. 1, one or more radio cells are connected to node B 6, which may be radio transceivers. Each node B 6, which supplies a plurality of cells 2 is connected to exactly one RNC 8 (RNC=radio network controller). As may be taken from FIG. 1, a node B 6 may be connected to its respective RNC 8, either directly or via an interface Iub between the RNC 8 and the node B 6. The RNCs 8 may be connected to each other via an interface Iur. The RNCs 8 can be connected to the core network CN 8 either directly or via an interface Iu-ps. The core network 8 comprises a plurality of serving GPRS support nodes SGSN 10, which are connected to the RNCs 8. The SGSNs 10 may be connected via respective Gn-Gp interfaces (GN: interface between GPRS support nodes within a public land mobile network; Gp: interface between GPRS support nodes of different public land mobile networks) to a gateway GPRS support nodes GGSN 12. The GGSN 12 is connected to a BM-SC (Broadcast Multicast Service Center) via an interface Gi. The BM-SC 14 is connected to a content provider 16. The SGSNs 10, the GGSN 12, the BM-SC 14 and the content provider are part of the core network CN 8.

The RNC 8, to which a respective node B 6 is connected is referred to as the controlling RNC (CRNC) of the respective node 6 or of the respective radio cells 2 served by the node B 6. In case a UE 18 logs into the mobile radio telecommunication network 4, which, in the case of FIG. 1, may be the UTRAN, i.e. the UMTS Terrestrial Radio Access Network, there is an RRC (Radio Resource Control) connection between the UE and the UTRAN. In this case, the UE is in the so-called connected mode. Hence, in case the UE receives data or content via a DCH (dedicated channel), the UE is in the CELL_DCH state. In case the UE receives data via channels different from the DCH in the connected mode, such a state is not referred to as the CELL_DCH state. An explicit description of these states can, for example, be taken from 3 GPP TS 25.346v1.3.0 "Introduction of Multimedia Broadcast/Multicast Service (MBMS) in the Radio Access Network (Stage-2)", which is hereby incorporated by reference; in the 3 GPP TS 23.846v6.1.0, "Multimedia Broadcast/Multicast Service; Architecture and Functional Description, (Release 6)", which is hereby incorporated by reference; and in 3 GPP TS 25.331v540 "Radio resource Control (RRC) protocol specification", Release 5, which is also hereby incorporated by reference.

The end points of the RRC connection are the respective UE 18 and the corresponding RNC 8, which may also be referred to as serving RNC (SRNC). The RRC connection is distinctively identified by the unique identifier ID of the UE 18 in the UTRAN, which is also referred to as U-RNTI (UTRAN Radio Network Temporary Identity). The U-RNTI is assigned to the UE 18 by the corresponding RNC 8 during the log-in procedure. By assigning the U-RNTI to the UE 18, the RNC 8 becomes an SRNC. The end points or termination points of the RNC connection are the same as the end points of the RLC (Radio Link Control) protocol, which provides for the segmentation of RLC Service Data Units (SDUs) and also for possible transmission repetitions of the SDU segments included in the RLC PDUs (Protocol Data Units). Directly after the log-in process, the SRNC and the CRNC are identical, however, in case the UE 18 is a mobile UE 18, such as a PDA, notebook or mobile telephone, the UE 18 may move from one radio cell 2 to another radio cell 2, which is assigned to another CRNC, while the SRNC remains the same.

The SRNS relocation procedure (SRNS: Serving Radio Network System) ensures that a new CRNC may take over the function of the SRNC for the respective UE 18. As mentioned above, the RNCs 8 may be connected by the Iu-ps interface to the core network (CN 8) via which connections, for example to the internet or other packet switching networks, may be carried out. The CN node which connects the RNCs 8 to the core network CN 8 are the so-called GPRS support nodes (GSN) 10. For supporting speech transmission, an RNC 8 may also be connected via the Iu-cs interface via an MSC (Mobile Switching Center not shown in FIG. 1) to the CN 8. The MSC connects the RNC 8 to a fixed telecommunication network, such as the ISDN network.

As mentioned above, the log-in of the UE 18 into the CN 4 requires the set-up of an RRC connection. Therewith, the UE may send the routing area update message (in the case of a packet switched transmission) or a location area update (in the case of speech transmission) to the Home Location Register (HLR, not shown in FIG. 1). By this, the UE 18 informs the network about its location within the routing area or the location area. In case the UE does not perform any pay load data/data content transmission and only wants to be available, the RRC connection is discontinued in order, for example, to save energy. This state is referred to as "idle mode". However, due to the missing RRC connection, the network does not have any information about the location of an idle mode UE with respect to the radio cell 2, in which the idle mode UE is currently located.

Besides the unambiguous identifier assigned to the UE during the RRC Connection, the RRC connection also enables the transmission of pay load data or content in an encoded form. Furthermore, it ensures that the control data, which in some cases cannot be encrypted, is protected by the so-called Integrity Protection against the unauthorized modification by a so-called man-in-the middle. For the data encryption, a so-called ciphering key is applied; for the integrity protection the so-called integrity key is used.

In case a p2m channel (point-to-multipoint channel) is used, the CRNC distributes the MBMS-Content (Multimedia Broadcast Multicast Service Content) via the node B 6 to the respective radio cells 2. In case a p2p channel, i.e. a point-to-point channel, such as a DCH is used, the SRNC transmits the MBMS content directly via an individual channel to the respective UE 18, such that in case there are more UEs 18, the same MBMS content has to be distributed by a plurality of p2p channels within the same radio cell 2 to the respective plurality of UEs 18.

The RNCs receive the MBMS content from the SGSNs 10, which in turn receive the MBMS content from the BM-SC (Broadcast Multicast Service Center) 14. Within the BM-SC 14, the MBMS content is stored or buffered after the provision by the content provider 16.

In case the CRNC determines for one radio cell 2 that the number of UEs having joined a service, for which a particular MBMS content transmission is planned or ongoing, justifies the transmission of the MBMS content via a p2m channel, the CRNC informs for each UE concerned the respective SRNC of the UE. Then, the CRNC switches to a p2m channel, and the respective SRNCs avoid the direct transmission to the concerned UEs via a p2p channel. This is described in detail in 3 GPP TS 25.346v1.3.0: "Introduction of Multimedia Broadcast/Multicast Service (MBMS) in the Radio Access Network (Stage 2)", which is hereby incorporated by reference. However, as already mentioned above, in case the number of UEs in the radio cell 2 the service carrying out the MBMS content transmission does not justify a transmission via the p2m channel due to the increased interference caused by the p2m channel, the MBMS content may be provided to the respective UEs 2 via a plurality of individual p2p channels. Then, the CRNC requests for each receiving UE the respective SRNC to establish or set-up the respective radio bearers (RB), which are to be used by the p2p channels. This is also referred to as channel type switching over Uu, which is the interface between the node B 6 and the UE 18, i.e. the air interface of the UMTS.

In the following with reference to FIG. 2, the MBMS content reception by UEs in the idle mode is described in further detail.

As mentioned above, the UEs may receive an MBMS content in case they are "joined" UEs, i.e. in case they have been registered with the respective service for the MBMS content during an initialization or joining procedure. This joining procedure, which may alternatively also be referred to as "MBMS Service Activation" is carried out between the UE, the SGSN and the BM-SC in the manner depicted in FIG. 2. A more detailed description of this joining procedure is, for example, described in 3 GPP TS 23.846-6.1.0, "Multimedia Broadcast/Multicast Service; Architecture and Functional Description, (Release 6)", which is hereby incorporated by reference.

By the joining procedure, a so-called MBMS context is generated in the RNCs, linking the identity of each joined UE with the identity of the MBMS service which provides the MBMS content. Due to this, the RNC may distribute the MBMS content into the radio cells, such that all joined UEs located in the respective radio cells may receive the MBMS content. This is depicted in more detail in FIG. 2.

At the beginning, as indicated with 1., the UE sends an active MBMS Context Request Message to the SGSN. The activate MBMS Context Request Message includes an IP Multicast address, which identifies the MBMS Multicast Service to which the UE wants to subscribe, i.e. which the UE wants to join. An APN (access point name) specifies the GGSN. Then, the SGSN analyses the activate MBMS Context Request message and determines the RNCs, which support the routing area in which the UEs are located and generates a number of MBMS contexts. The number of MBMS contexts corresponds to the number of RNCs serving the routing area. Then, as indicated by 2. in FIG. 2, security functions may be carried out, such as an authentication of the UE. However, these security functions are not necessary for the implementation of the present invention. Then, as indicated with 3. in FIG. 2, in case the UE is the first one which activates a particular MBMS multicast service in this routing area, the SGSN determines the RNCs which support or serve the routing area and requests generation of an MBMS context on the GGSN as well as the establishing of a GPRS tunnel between the SGSN and GGSN.

Figure 2:
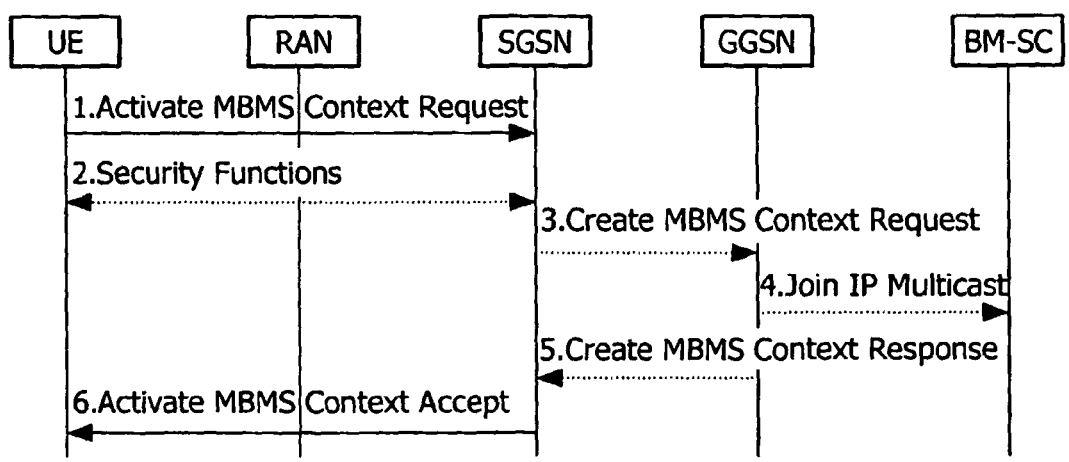
FIG. 2 shows a simplified procedure for the service activation according to an exemplary embodiment of the present invention.

As indicated with 4. in FIG. 2, the GGSN establishes a connection for the requested multicast IP address to the MBMS data source, i.e. the BM-SC in case the GPRS tunnel is the first one for this MBMS multicast service. Then, as indicated with 5. in FIG. 2, the GGSN confirms the generation of MBMS contexts to the SGSN. Then, as indicated with 6. the SGSN sends the activate MBMS Context Accept Message to the UE, which includes the TMGI, i.e. the temporary multicast group identity.

Furthermore, the UEs receive security related data (for example encryption keys) by means of the "joining" process, which enables them to decode the MBMS content when transmitted. A "joined" UE can relinquish its reception privilege in a corresponding "Leaving" procedure. By this, security related data is amended in such a way that only the remaining "joined" UEs are able to decode the MBMS content. "Joining" and "Leaving" are crucial pre-requisites for a billing concept, which is not only based on a fixed term of subscription, but also on the actual data reception.

In the meantime, it is deemed necessary that MBMS content reception should also be possible for "joined" UEs when they are in the idle mode, in order to save battery energy as far as possible, even during the MBMS content reception. This applies in particular to the transmission of MBMS content, where a significant number of participants are expected and thus the joining process should take place prior to transmission, in order to avoid a mass access to radio resources for the joining process alone. This can, for example, be the case in the so-called "football stadium scenario", when spectators experience a football game live in the stadium and want to receive, on their mobile phone, transmission of the goals scored in other football games taking place at the same time.

Since the cell, in which an idle mode UE is situated, is not known to any RNC, an RNC cannot make its decision about the transmission of the MBMS content concerning a p2p channel or concerning a p2m channel dependent on the "joined" UEs, which might or might not be present in the cell in the idle mode, without taking additional steps. This is always unfavorable when the MBMS content in a cell is distributed via p2p channels to a few individual "joined" UEs, which are in connected mode. However, if the MBMS content is distributed via a p2m channel in a cell, then a UE in idle mode can receive this content without further steps being taken, in so far as a notification is transmitted on a separate control channel (MCCH: Multicast Control Channel) via a (further) p2m channel, via which the idle mode UE learns that the MBMS content is at present being transmitted or that its transmission is about to begin (cf. 3 GPP TS 25.346v1.3.0: "Introduction of Multimedia Broadcast/Multicast Service (MBMB) in the Radio Access Network (Stage-2)", which is hereby incorporated by reference).

Thus, the task at hand is, for every radio cell, to inform the CRNC intending to or having already distributed MBMS content, about the number of UEs in connected mode and in idle mode which are "joined" UEs and which actually want to receive the MBMS content to be transmitted and at the same time to ensure that only these named UEs are hereby counted. The architecture may take the general rule into consideration, that payment will only be made for the content, if it can actually be received. "Joined" UEs in a cell in which the content is transmitted for which they have registered, but which they do not wish to receive, should, in this general rule, not be taken into account in the determination of the use of a p2p or p2m channel.

This is unproblematic for connected mode UEs, since these are able to communicate their reception request to the SRNC with integrity protection, as a result of the existing RRC connection. Since the RRC connection between SRNC and UE exists, a "counting message" must always reach the SRNC, from where it can be forwarded to the CRNC. The SRNC then transmits this information to the CRNC so that the decision regarding the choice of a p2p or p2m channel can be made. The communication of the reception request is here defined as a counting message, since it is the purpose of this communication to determine the total number of "joined" UEs requesting reception.

On the other hand, idle mode UEs cannot authenticate themselves via an SRNC vis-à-vis a CRNC by means of integrity protection, since no SRNC exists for such a UE on account of the missing RRC connection and thus, an integrity key is not known either to an SRNC or to a UE. This means that "false" UEs, which have not activated the MBMS content, or whose users have not even subscribed to the MBMS service, could answer an MBMS content notification simply with a counting message and thus simulate a greater number of UEs requesting reception than actually exist, so that a p2m channel is always used and the cell capacity is thereby reduced (for the use of a p2m channel it is assumed that approx. 30% of the transmission capacity is necessary in the cell), which can be understood as some weak denial-of-service, since the unnecessarily high interference of the p2m channel might lead to the rejection of other connections (in the considered radio cell) needing a DCH, e.g. for speech transmission.

Furthermore, it should be ensured that an idle mode UE, which is also a "joined" UE with respect to the transmitted MBMS content and which wants to receive the MBMS content, cannot be counted more than once, or rather cannot send several different counting messages, which the CRNC then counts separately.

The following three cases must be differentiated when determining whether a p2m or a p2p channel is advantageous:
1. Exactly N1 UEs answer a notification with a counting message and all N1 UEs are in connected mode
   a. $N1 <= S_{p2p}$: UEs must be called upon to change to CELL_DCH state
   b. $N1 >= S_{p2p}$: UEs can remain in the state in which they are and receive the p2m channel in addition.
2. Exactly N2 UEs answer a notification with a counting message and all N2 UEs are in the idle mode
   a. $N2 <= S_{p2p}$: The UEs must be called upon to change to CELL_DCH state (i.e. also in the connected mode)
   b. $N2 > S_{p2p}$: The UEs can remain in the idle mode and receive MBMS content via the p2m channel
3. Exactly N1+N2 UEs answer a notification with a counting message and of these N1 UEs are in the connected mode and N2 UEs are in the idle mode:
   a. $N1+N2 <= S_{p2p}$: UEs must be called upon to change to CELL_DCH state (i.e. the N2 idle mode UEs change to connected mode)
   b. $N1+N2 > S_{p2p}$: UEs can remain in the state (connected mode or idle mode) in which they are and receive in addition the p2m channel.

Thus, for an idle mode UE, the counting message can lead to the fact that the UE must change to the CELL-DCH status (connected mode), in order to receive the MBMS content.

Figure 3A:
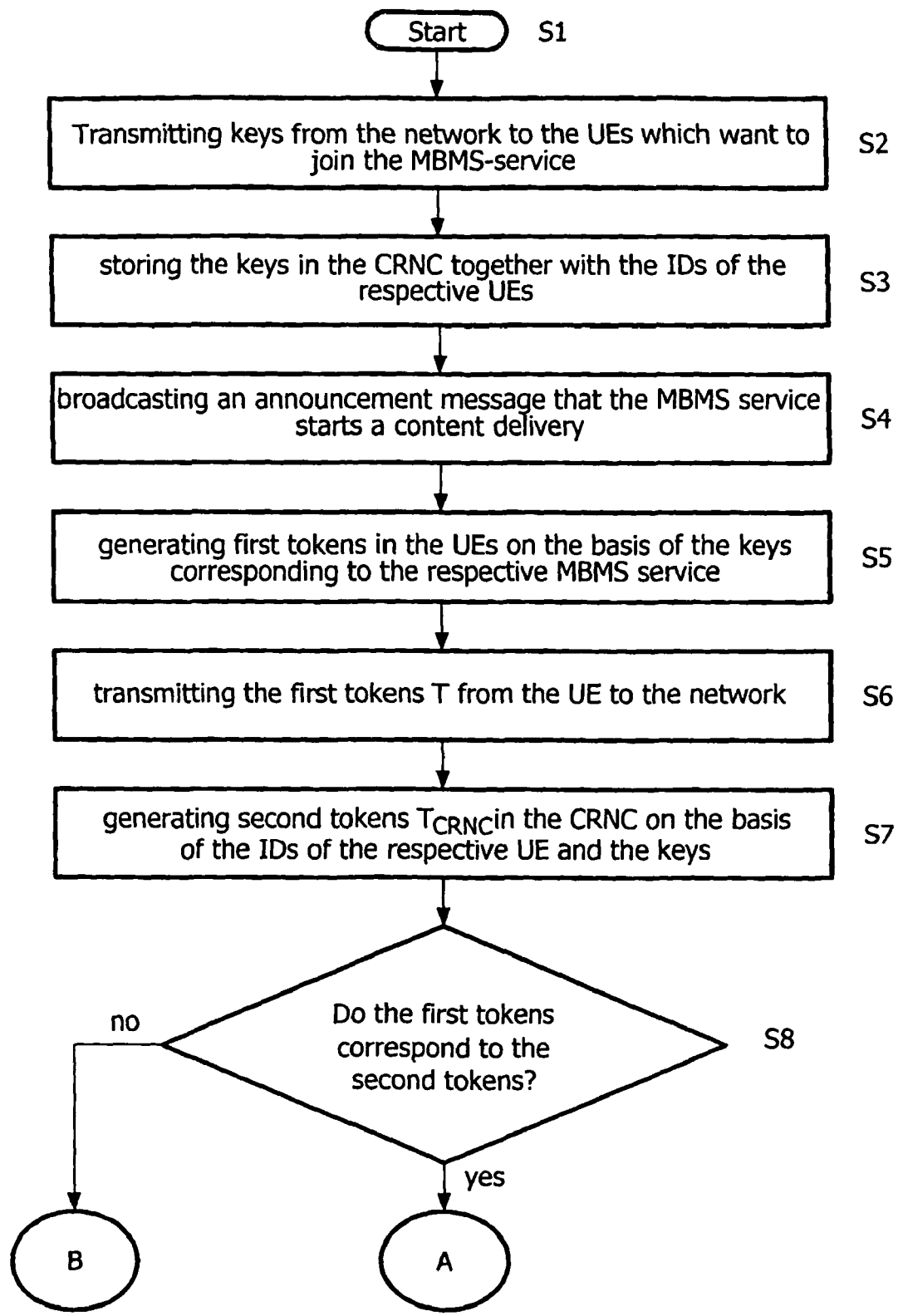
FIGS. 3a and 3b show a flow-chart of a method according to an exemplary embodiment of the present invention.
Figure 3B:
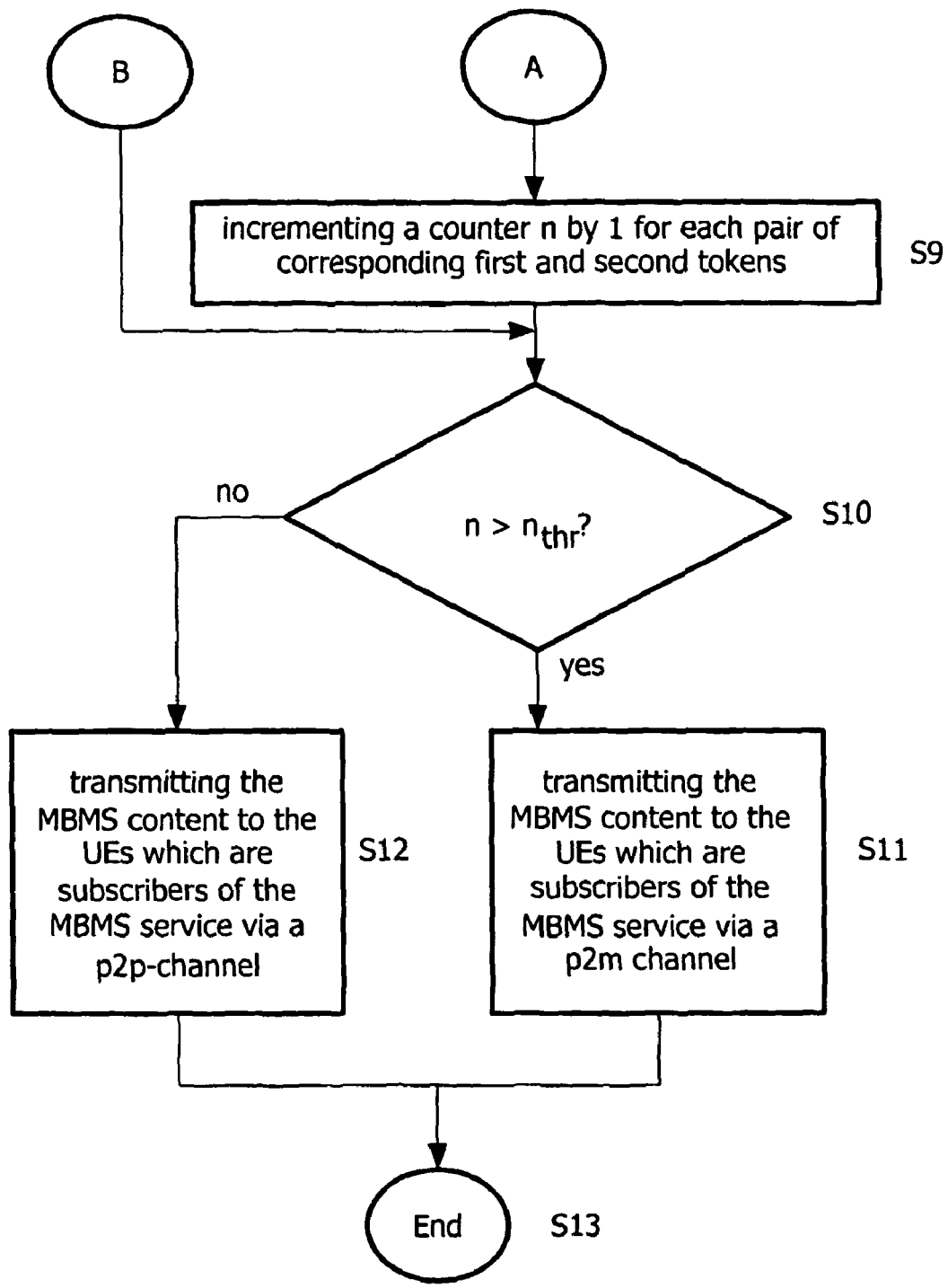

FIGS. 3a and 3b are a flowchart of an exemplary embodiment of a method for operating a mobile radio telecommunication network according to the present invention. After the start in step S1, the method continues to step S2, where the network transmits keys to the UEs which want to join the MBMS service. According to this aspect of the present invention, during the joining process, i.e. the activation of the multicast service, the joining UEs are provided with a secret key, which is only known to the UE, to the SGSN and, after the joining process, to the RNCs of the location area. Then, after transmission of the keys from the network to the UEs, the method continues to step S3, where the keys provided to the respective UEs subscribed to the service are stored in the CRNC together with the IDs of the respective UEs. Then, the method continues to step S3, where the network, i.e. the RNCs broadcast an announcement message that the MBMS service starts a content delivery in step S4. The announcement of the start of the content delivery may be made via a notification channel. Then, the method continues to step S5, where the UEs subscribed to the service generate first tokens T on the basis of the keys corresponding to the respective MBMS service. The tokens may be generated in accordance with a prescribed algorithm $f_{count}$ on the basis of a randomly determined number, which may, for example, have 20 bits and the key, by using the MBMS service ID, identifying the MBMS service in question. Thus, the first token T can be determined in accordance with the following equation:

$$T = f_{count}(\text{key}, \text{MBMS-service ID}, \text{auxiliary number}).$$

Then, the method continues to step S6, where the UEs transmit the first tokens T to the RNCs, which forward them to the CN. Then, the method continues to step S7, where second tokens $T_{CRNC}$ are generated in the CRNC on the basis of the IDs, which were stored in the CRNC in step S3. Then, the method continues to step S8, where the CRNC or any other suitable network element in the mobile radio telecommunication network matches the first tokens to the second tokens. In case it is determined that the first tokens match the second tokens, i.e. the first tokens correspond to the second tokens, as indicated with the encircled A at the bottom of FIG. 3a and at the top of FIG. 3b, the method continues to step S9, where a counter n is incremented by one for each pair of corresponding first and second tokens.

In case it is determined in step S8 that the first token does not match to the second token, the method continues to step S10 as indicated by the encircled B at the bottom of FIG. 3a and at the top of FIG. 3b.

In step S10, it is determined whether the value of the counter n, i.e. the number of UEs subscribed to the service within the radio cell exceeds a threshold above which a transmission of the MBMS content via a p2m channel is more favorable than the transmission via the p2p channels with respect to the interference. In case it is determined in step S10 that the counter n exceeds the threshold $n_{thr}$, the method continues to step S11, where the MBMS content is transmitted to the subscribed or joined UEs of the MBMS service via a p2m channel. Then, after step S11, the method continues to step S13, where it ends.

In case it is determined in step S10 that the counter value n does not exceed the threshold value $n_{thr}$, the method continues to step S12, where the MBMS content is transmitted to the UEs, which are subscribed to the respective MBMS service via individual p2p channels. Then, after step S12 the method continues to step S13, where it ends.

As indicated above, in step S6, the UEs transmit the first token to the CRNC. According to an aspect of the present invention, together with the first tokens, the UEs may transmit a UE identifier, such as a UE-ID, for example the TMSI, which is a temporary mobile subscriber identity. The first tokens and the UE identifier may be transmitted to the CRNC via a modified RRC connection set-up message, as for example described in 3 GPP TS 25.331 v540 "Radio Resource Control (RRC) protocol specification", Release 5, which is hereby incorporated by reference.

As indicated with respect to step S3, the CRNC has, for example, as part of the MBMS context, the keys transmitted to the joined UEs, together with the identity or identifier of the joined IDs. As indicated in step S7, after receiving the first token from the UEs, i.e. after receiving the counting message from the UEs, the CRNC generates a second token $T_{CRNC}$ on the basis of the UE-ID, which may, as indicated above, be contained in the counting message by means of the auxiliary number, which, as indicated above, may also be contained in the counting message, the key and the MBMS service ID of the MBMS service concerned, from which the number of receiving joined UEs should be determined. According to an aspect of the present invention, the algorithms for generating the first and second tokens are such that the first and second tokens correspond to each other. In case the first token T received from the UE and the second token $T_{CRNC}$ determined by the respective CRNC corresponding to the first token T, correspond to each other, the UE is determined as being a "valid" UE, which has to be counted and, as indicated with reference to step S9, a counter is incremented by one. Advantageously, as indicated above, the auxiliary number, which may be used for the generation of first and second tokens, allows to ensure that counting messages are only counted once. By this it can be avoided that an unauthorized copy of an UE, which was received and copied during a preceding counting procedure or during the actual counting procedure is re-sent and causes an incorrect count value.

According to an aspect of the present invention, the auxiliary number for generating the first token T may be determined by the UE and sent to the CRNC in the counting message in step S6 as plain text or clear text. Advantageously, due to this, the auxiliary number does not have to be sent via the notification channel and thus, no increase of the traffic on the notification channel is caused. Advantageously, for each counting process a new auxiliary number may be determined, which, for example, may be incremented for each counting process by one. The CRNC may store the auxiliary number of the preceding counting procedure and then may only include counting messages from UEs including the valid, i.e. actual auxiliary number. It is also possible that the CRNC only includes counting messages in an actual counting process, which contain auxiliary numbers exceeding an auxiliary number of a preceding counting process stored in the CRNC.

According to another aspect of the present invention, the auxiliary number may be the absolute time, for example the year, month, day, hour, minute, and second, which may be included in the counting message. The counting network component, i.e. the CRNC, compares the time stamp included in the counting message to its own absolute time. In case the difference between the own actual time and the time stamp received does not exceed a prescribed threshold value, the CRNC assumes that the counting message is not a copied and re-sent version of a counting message and thus generates, by using the key, the MBMS service ID, the UE identifier and the auxiliary number, the second token and matches the second token to the first token. Thus, according to this exemplary embodiment of the present invention, an easy determination can be made, whether the received counting message is a valid counting message and not a copied or re-sent counting message.

According to another aspect of the present invention, the auxiliary number for the determination of the first token T may be a random number, determined by the CRNC, which sends the counting notification via the notification channel. This random number may be sent to the UEs as a clear text or plain text of the notification message sent from the CRNC to the respective UEs. Advantageously, according to this aspect of the present invention, the random number has to be included in the notification message. However, the UE only needs to transmit the first token together with the UE-ID in the counting message to the CRNC and the CRNC only needs to store the random number for the duration of the counting process. The random number can be changed for each counting process.

According to another aspect of the present invention, during the joining process, a plurality of secret first tokens may be submitted to the UE joining the service. Then, after reception of a counting notification from the CRNC, the UE transmits one of the secret first tokens with its own UE-ID, the MBMS service ID of the MBMS service to the CRNC by means of the counting message. According to this aspect of the present invention, the number of secret tokens is also provided for each UE to each RNC in the routing area as a part of the joining procedure. The UE uses only one first token for one counting procedure. In case the CRNC receives the counting message, including the UE-ID and the MBMS service ID, it searches the corresponding second token in the MBMS context of the indicated MBMS service with the indicated UE-ID. In case there is a second matching token in the MBMS context, the UE is counted and this second token is deleted. In case the first token cannot be matched to a second token, the counting message is ignored. A UE has to discard any token, which it has transmitted as part of a counting message.

According to another aspect of the present invention, only the token together with the MBMS service ID is sent as a part of the counting message to the counting network component, i.e. the CRNC or another suitable element in the network, and the first token is computed from the absolute time, the key and the MBMS service ID, whereby the predefined accuracy, in which the absolute time is measured, is such that transmission of the counting message as well as processing and evaluating the received counting message can both be done within a time interval equal to the accuracy interval. Such a predefined accuracy could be e.g. 1000 ms. Then, the counting network component computes the second token based on its own absolute time after receiving the counting message, where the absolute time is also measured with the mentioned predefined accuracy. If the first and second token do not match, the counting network component computes the second token based on the absolute time, when the counting message was received, set into the past by the accuracy interval. If the first and second token then match, the corresponding UE is looked upon as one, which has to be counted. If the first and second token still do not match, the counting message is ignored.

It should be noted, that due to the radio frame timing, both CRNC and the UE can maintain synchronized clocks of the predefined low accuracy.

According to another aspect of the present invention, in case the number of received counting messages exceeds the threshold where the transmission via the p2m channel is favorable, all further counting messages which are received can be ignored. However, in case the secret set of first tokens are handed over to the UEs during the joining procedure, the already used second tokens have to be deleted in the CRNC, such that even if the number of counted joined UEs exceeds the threshold level, the received messages have to be analyzed and the respective tokens or auxiliary numbers have to be registered or deleted.

Advantageously, according to the present invention, a highly accurate counting is provided, since only idle mode UEs, which have already joined the respective MBMS service are included in the counting process of the CRNC. Other counting messages of other UEs are ignored. Furthermore, advantageously, an idle mode UE could send a plurality of counting messages in response to the MBMS service notification, but independently of the number of sent counting messages, this UE is only counted as one, since only one counting message is included in the counting process.

The invention claimed is:

1. A method for counting user equipment units capable of decoding contents of a multimedia broadcast/multicast service (MBMS), wherein each user equipment unit has an identifier, wherein the user equipment units are located within a radio cell of a mobile radio telecommunication network, said method comprising the steps of:
providing at least one processor for performing the steps of:
determining for each of the user equipment units during the activation of the service whether to join the service;
providing each of the user equipment units who are determined to join the service with a key during the activation of the service;
broadcasting an announcement message in the radio cell;
transmitting first tokens from the user equipment units to the mobile radio telecommunication network, the first tokens generated based on an algorithm derived from one or more of the following variables: a random number, an auxiliary number, a service identifier, and the key;
matching the first tokens to second tokens in the mobile radio telecommunication network; and
counting pairs of corresponding first and second tokens;
wherein the radio cell informs a central radio network controller (CRNC) of a status of all the user equipment units that are in a connected mode or in an idle mode that have already joined the MBMS service and intend to receive the contents of the service and the CRNC only counts each one of those user equipment units as one disregarding at least one message sent by a single non-intended user equipment in order to select either point-to-point or point-to-multipoint communication channels for transmission.

2. The method of claim 1, further comprising the steps of:
storing the keys together with the respective identifiers of the user equipment units in the mobile radio telecommunication network;
generating the first tokens in the user equipment units on the basis of the identifiers and the keys; and
generating the second tokens in the mobile radio telecommunication network on the basis of the identifiers and the respective keys stored in the mobile radio telecommunication network.

3. The method of claim 2,
wherein the keys are secret,
wherein each user equipment unit subscribed to the service generates the first token on the basis of the key and the auxiliary number; and
wherein each user equipment unit subscribed to the service transmits the first token and the auxiliary number to the mobile radio telecommunication network.

4. The method of claim 3,
wherein the auxiliary number represents the time; and
wherein the mobile radio telecommunication network matches the first tokens to the second tokens in case the time represented by the auxiliary number is not older than a predetermined threshold.

5. The method of claim 3,
wherein the auxiliary number is a number randomly determined by the mobile radio telecommunication network which is transmitted to the user equipment units with the announcement message; and
wherein the auxiliary number is changed for each counting process.

6. The method of claim 3,
wherein the auxiliary number is incremented for each counting process such that there is an actual auxiliary number for each counting process; and
wherein the mobile radio telecommunication network matches only the first tokens to second tokens which were received together with the actual auxiliary number.

7. The method of claim 3, wherein the auxiliary number is sent as plain text.

8. The method of claim 2,
wherein the generation of the first tokens in the user equipment units is further based on the time; and
wherein, in the mobile radio telecommunication network, the generation of the second tokens is further based on the time.

9. The method of claim 8,
wherein, in the mobile radio telecommunication network, a plurality of second tokens is generated;
wherein a third token of the plurality of second tokens is generated on the basis of the actual time;
wherein a fourth token of the plurality of second tokens is generated on the basis of a shifted time,
wherein the shifted time precedes the actual time by a predetermined period of time; and
wherein a corresponding pair of first and second tokens is counted when one of the third and fourth tokens matches the first token.

10. The method of claim 1, wherein the keys respectively provided to the user equipment units subscribed to the service each include a plurality of first tokens, the method further comprising the step of:
storing a plurality of second tokens corresponding to the first tokens in the radio telecommunication network together with the identifiers of the user equipment units provided with the keys.

11. The method of claim 1, wherein the service is a Multimedia Broadcast Multicast Service and the radio telecommunication network is based on Code Division Multiple Access technology.

12. The method of claim 1, further comprising transmitting a counting message by at least one user equipment unit for simulating a greater number of user equipment units requesting the contents of the service than actually exist.

13. The method of claim 1, wherein the auxiliary number ensures accurate counting of the user equipment units.

14. A radio network controller for counting user equipment units capable of decoding contents of a multimedia broadcast/multicast service (MBMS),
wherein each user equipment unit has an identifier,
wherein the user equipment units are located within a radio cell which is controlled by the radio network controller, and wherein, for counting user equipment units subscribed to the service, the radio network controller comprises at least one processor programmed to perform the following operation:
  determining for each of the user equipment units during the aviation of the service whether to join the service;
  providing each of the user equipment units who are determined to join the service with a key during the activation of the service;
  broadcasting an announcement message in the radio cell;
  receiving first tokens from the user equipment units to the mobile radio telecommunication network, the first tokens generated based on an algorithm derived from one or more of the following variables: a random number, an auxiliary number, a service identifier, and the key;
  matching the first tokens to second tokens;
  counting pairs of corresponding first and second tokens; and
  outputting the number of matched pairs as the number of user equipment units subscribed to a service;
wherein the radio cell informs a central radio network controller (CRNC) of a status of all the user equipment units that are in a connected mode or in an idle mode that have already joined the MBMS service and intend to receive the contents of the service and the CRNC only counts each one of those user equipment units as one disregarding at least one message sent by a single non-intended user equipment in order to select either point-to-point or point-to-multipoint communication channels for transmission.

15. The radio network controller of claim 14,
wherein the radio network controller is further adapted to store the keys together with the respective identifiers of the user equipment units; and
wherein the radio network controller is further adapted to generate the second tokens in the mobile radio telecommunication network on the basis of the identifiers and the respective keys.

16. The radio network controller of claim 14,
wherein the announcement message includes at least one of a time-stamp and the auxiliary number; and
wherein the radio network controller matches the first and second tokens only when they were received together with a time stamp not older than a predetermined threshold in case the announcement message includes the time-stamp or with a valid auxiliary number of the actual counting process and not an invalid auxiliary number from a preceding counting process in case the announcement message includes the auxiliary number.

17. A user equipment unit for operation in a radio cell controlled by a radio network controller of a mobile radio telecommunication network, wherein the user equipment unit is capable of decoding contents of a multimedia broadcast/multicast service (MBMS); wherein the user equipment unit has an identifier in the mobile radio telecommunication network, wherein the user equipment unit is adapted to perform the following operation during a counting process of user equipment units in the radio cell which are subscribed to the service, after having determined that the user equipment unit intends to join the service during activation of the service and the user equipment has been provided with a key from the radio network controller during activation of the service; said user equipment unit comprising at least one processor programmed for performing:
  receiving an announcement message from the radio network controller;
  generating a first token on the basis of the identifier and the key; and
  transmitting the first token to the mobile radio telecommunication network, the first token generated based on an algorithm derived from one or more of the following variables: a random number, an auxiliary number, a service identifier, and the key;
wherein the radio cell informs a central radio network controller (CRNC) of a status of all the user equipment units that are in a connected mode or in an idle mode that have already joined the MBMS service and intend to receive the contents of the service and the CRNC only counts each one of those user equipment units as one disregarding at least one message sent by a single non-intended user equipment in order to select either point-to-point or point-to-multipoint communication channels for transmission.

18. The user equipment unit according to claim 17,
wherein the user equipment unit generates the first token on the basis of the key and the auxiliary number; and
wherein the user equipment unit transmits the first token and the auxiliary number to the network.

19. The user equipment unit according to claim 17, further comprising transmitting a counting message to said CRNC by the user equipment unit.

20. A non-transitory computer-readable storage medium storing a set of programmable instructions configured for execution by at least one processor for performing a method of operating a radio network controller of a mobile radio telecommunication network for counting user equipment units capable of decoding contents of a multimedia broadcast/multicast service (MBMS), wherein each user equipment unit has an identifier, wherein the user equipment units are located within a radio cell which is controlled by the radio network controller, and wherein, for counting user equipment units subscribed to the service, the method comprising the steps of:
  determining for each of the user equipment units during the activation of the service whether to join the service;
  providing each of the user equipment units who are determined to join the service with a key during the activation of the service;
  broadcasting an announcement message in the radio cell;
  receiving a number of first tokens from the user equipment units to the mobile radio telecommunication network, the first tokens generated based on an algorithm derived from one or more of the following variables: a random number, an auxiliary number, a service identifier, and the key;
  matching the first tokens to second tokens; and counting pairs of corresponding first and second tokens; and
  outputting the number of matched pairs as the number of user equipment units subscribed to a service;
wherein the radio cell informs a central radio network controller (CRNC) of a status of all the user equipment units that are in a connected mode or in an idle mode that have already joined the MBMS service and intend to receive the contents of the service and the CRNC only counts each one of those user equipment units as one disregarding at least one message sent by a single non-intended user equipment in order to select either point-to-point or point-to-multipoint communication channels for transmission.

21. A non-transitory computer-readable storage medium storing a set of programmable instructions configured for execution by at least one processor for performing a method of operating a user equipment unit in a radio cell controlled by a radio network controller of a mobile radio telecommunication network, wherein the user equipment unit is capable of decoding contents of a multimedia broadcast/multicast service (MBMS); wherein the user equipment unit has an identifier in the mobile radio telecommunication network, wherein the user equipment performs the following operation during a counting process of user equipment units in the radio cell which are subscribed to the service, after having determined that the user equipment unit intends to join the service during activation of the service and the user equipment has been provided with a key from the radio network controller during the activation of the service, the method comprising the steps of:

receiving an announcement message broadcast from the radio network controller in the radio cell;

generating the first token based on an algorithm derived from one or more of the following variables: a random number, an auxiliary number, a service identifier, and the key; and transmitting the first token to the mobile radio telecommunication network;

wherein the radio cell informs a central radio network controller (CRNC) of a status of all the user equipment units that are in a connected mode or in an idle mode that have already joined the MBMS service and intend to receive the contents of the service and the CRNC only counts each one of those user equipment units as one disregarding at least one message sent by a single non-intended user equipment in order to select either point-to-point or point-to-multipoint communication channels for transmission.

* * * * *